(12) United States Patent
Himmelmann et al.

(10) Patent No.: US 7,737,591 B2
(45) Date of Patent: Jun. 15, 2010

(54) COAXIAL TWIN VARIABLE FIELD PERMANENT MAGNETIC DYNAMOELECTRIC MACHINE

(75) Inventors: Richard A. Himmelmann, Beloit, WI (US); Mohammad Shahamat, Rockton, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 131 days.

(21) Appl. No.: 12/135,568

(22) Filed: Jun. 9, 2008

(65) Prior Publication Data

US 2009/0302700 A1 Dec. 10, 2009

(51) Int. Cl.
*H02K 16/00* (2006.01)
*H02K 21/00* (2006.01)

(52) U.S. Cl. .................. 310/114; 310/112; 310/113; 310/190; 310/191; 310/209

(58) Field of Classification Search .......... 310/209, 310/190, 191, 112–114, 216.108, 216.106, 310/266

See application file for complete search history.

(56) References Cited

U.S. PATENT DOCUMENTS 5,998,901 A * 12/1999 Kawabata et al. .......... 310/114

7,637,333 B2 * 12/2009 Grundl et al. ............. 180/65.22

FOREIGN PATENT DOCUMENTS

JP        2004147410 A  *  5/2004

* cited by examiner

*Primary Examiner*—Quyen Leung
*Assistant Examiner*—Eric Johnson
(74) *Attorney, Agent, or Firm*—Stephen G. Mican

(57) ABSTRACT

A coaxial twin variable field permanent magnetic dynamoelectric machine comprising first and second stators displaced from each other and first and second permanent magnet rotors. The rotors comprising hydraulic actuators mounted within the rotors for axially displacing the outer and inner surfaces of the first and second rotors, respectively, with the inner and outer surfaces of the first and second stators, respectively, in order to change magnetic flux interaction between the first stator and rotor and the second stator and rotor. Both stators have magnetic shields covering outer and inner surfaces of the first and second stators, respectively. The first axial hydraulic actuator displaces the first rotor outer surface within the second stator magnetic shield and the second axial hydraulic actuator displaces the second rotor inner surface over the first stator magnetic shield with reduced first rotor-second stator and second rotor-first stator magnetic flux interaction.

20 Claims, 3 Drawing Sheets

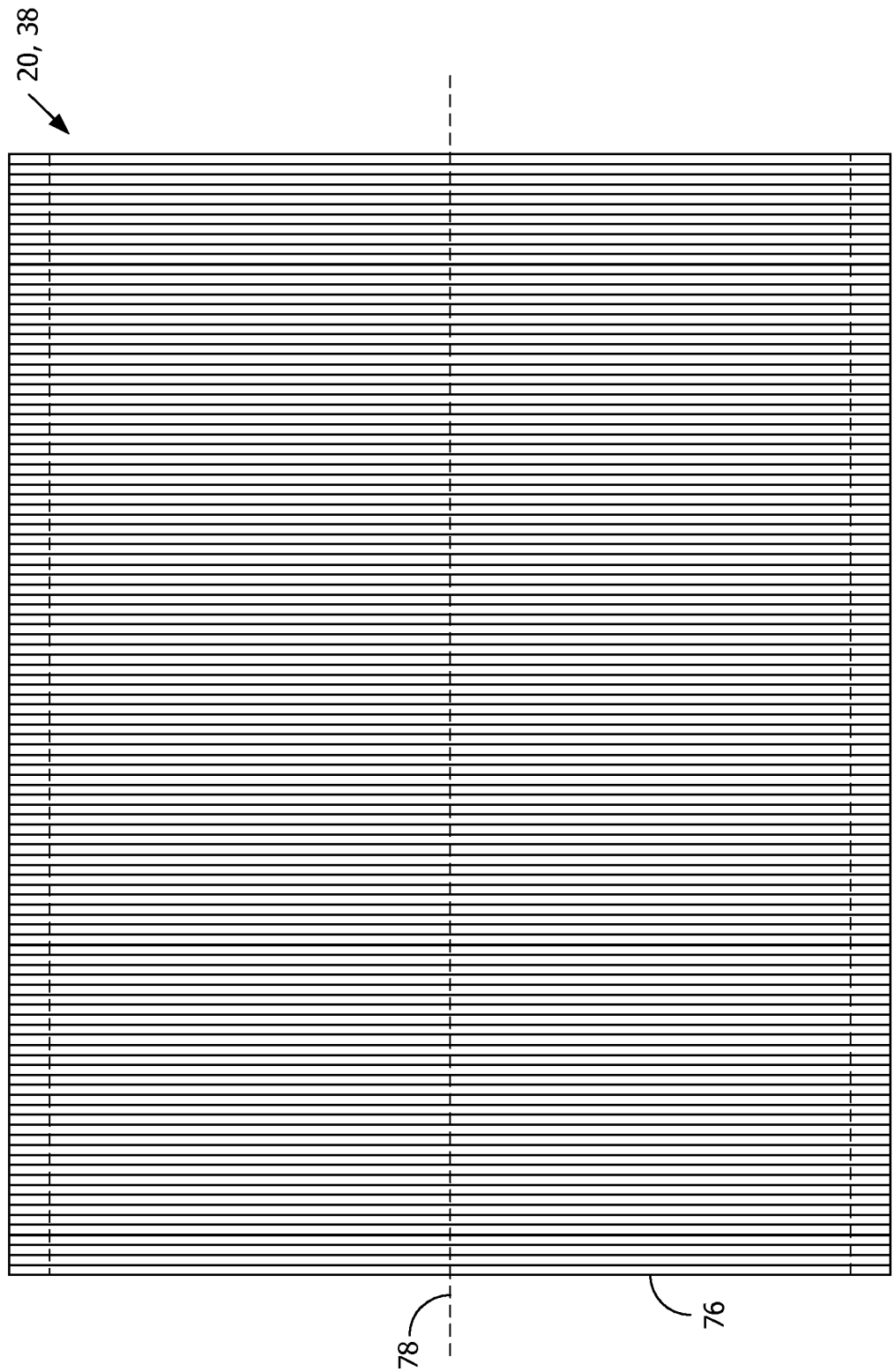

COAXIAL TWIN VARIABLE FIELD PERMANENT MAGNETIC DYNAMOELECTRIC MACHINE

FIELD OF THE INVENTION

The invention relates to paired dynamoelectric machines coupled to a common drive shaft, and more particularly to such paired machines coupled to the drive shaft with common axes of rotation.

BACKGROUND OF THE INVENTION

Ordinary dynamoelectric machines of the permanent magnet type have a rotor assembly comprising a plurality of permanent rotor magnets arranged radially around a drive shaft that rotate with the drive shaft about a stator assembly that comprises a plurality of stator poles and a stator winding. The rotor magnets have a fixed axial alignment that generally coincides with the axial position of the stator poles. The rotor magnets have a fixed radial alignment that is inside the radial position of the stator poles for machines of the conventional type or outside the radial position of the stator poles for machines of the "inside out" type.

Since the rotor magnets have a fixed radial and axial alignment with respect to the stator poles, when used as a generator the electrical potential that the dynamoelectric machine generates is primarily proportional to the rotational speed of the rotor assembly and the power consumed by an electrical load. As a generator, a primary problem with this class of machines is that there is no convenient way to regulate the generated electrical potential that may vary with rotational speed and load variations, unlike dynamoelectric machines with a rotor winding that may control rotor winding current from an exciter for regulation.

Similarly, when used as a motor driven by source of electric power, the back electromotive force (EMF) that the dynamoelectric machine generates subtracts from the electrical potential of the power source. The power source must supply increasing electrical potential for increasing speed at constant torque. Eventually, the power source cannot supply additional potential and then the output torque of the dynamoelectric machine falls with increasing speed until no further torque is achievable.

As a motor, a primary problem with this class of machines is that there is no convenient way to regulate the generated back EMF that increases with rotational speed, unlike dynamoelectric machines with a rotor winding that may control rotor winding current from an exciter to reduce back EMF at high speeds and thereby achieve high speed output torque.

Consequently, ordinary dynamoelectric machines of the permanent magnet type used as a generator may produce a lower electrical potential than required when operated at a slower rotational speed than a desired operational speed and produce too much potential when operated at a faster rotational speed than the desired operational speed. Such variations in potential can cause hazardous conditions or damage to electrical components that comprise the electrical load. Ordinary dynamoelectric machines of the permanent magnet type used as a motor have poor torque characteristics at high speeds when they have a design that requires high torque at low speeds.

U.S. Ser. No. 11/405,743, filed 17 Apr. 2006 by Himmelmann et al., owned by the assignee of this application and incorporated in this application by reference, describes a new type of permanent magnet dynamoelectric machine that has at least one permanent magnet rotor that is axially displaceable by hydraulic means to achieve a variable rotor field characteristic. An active or passive control system may control the rotor displacement of this variable field permanent magnet (VFPM) machine to regulate the output potential in generator service or torque in motor service. U.S. Ser. No. 12/034,759, filed 21 Feb. 2008 by Himmelmann et al., owned by the assignee of this application and incorporated in this application by reference, describes an example of an active control system for such a VFPM machine.

Some applications may require a pair of such VFPM machines to drive a single drive shaft, either in a direct-coupled torque summing mode or a speed-summing mode by way of a gearbox, such as an epicyclic gear train. In either case, the minimum length of the entire assembly would be twice the length of each machine at maximum rotor displacement plus the length of a coupling gearbox, if any. Unfortunately, such an assembly may be too long for certain applications, such as part of a power drive train for a tracked vehicle wherein each track may have one machine as a propulsion motor and the other machine as a steering motor.

SUMMARY OF THE INVENTION

The invention generally comprises coaxial twin variable field permanent magnetic dynamoelectric machine comprising: a first stator that comprises a first stator inner surface with a first stator axis; a first permanent magnet rotor that comprises a first rotor outer surface that is smaller than the first stator inner surface with a first rotor axis that is substantially coincident with the first stator axis and with the first rotor outer surface adjacent the first stator inner surface; at least one first axial hydraulic actuator mounted within the first rotor for axially displacing the first rotor outer surface along the first rotor axis relative to the first stator inner surface in a first axial direction to change magnetic flux interaction between the first stator the first rotor; a first magnetic shield that covers an outer surface of the first stator; a second stator displaced from the first stator in the first axial direction that comprises a second stator outer surface with a second stator axis that is substantially coincident with the first stator axis; a second permanent magnet rotor that comprises a second rotor inner surface that is larger than the second stator outer surface with a second rotor axis for the second rotor inner surface that is substantially coincident with the second stator axis and with the second rotor inner surface adjacent the second stator outer surface; at least one second axial hydraulic actuator mounted within the second rotor for axially displacing the second rotor inner surface along the second rotor axis relative to the second stator outer surface in a second axial direction opposite the first axial direction to change magnetic flux interaction between the second stator and the second rotor; a second magnetic shield that covers an inner surface of the second stator; and a drive shaft with a drive shaft axis of rotation that is substantially coincident with the first and second stator axes of rotation that couples to the first and second rotors; wherein the first axial hydraulic actuator may displace the first rotor outer surface within the second magnetic shield and the second axial hydraulic actuator may displace the second rotor inner surface over the first magnetic shield with reduced first rotor-second stator and second rotor-first stator magnetic flux interaction.

DESCRIPTION OF THE DRAWINGS

FIG. 3 is a detailed side view of first and second magnetic flux containment shields for the possible embodiments of the invention shown in FIGS. 1 and 2.

DETAILED DESCRIPTION OF THE INVENTION

Figure 1:
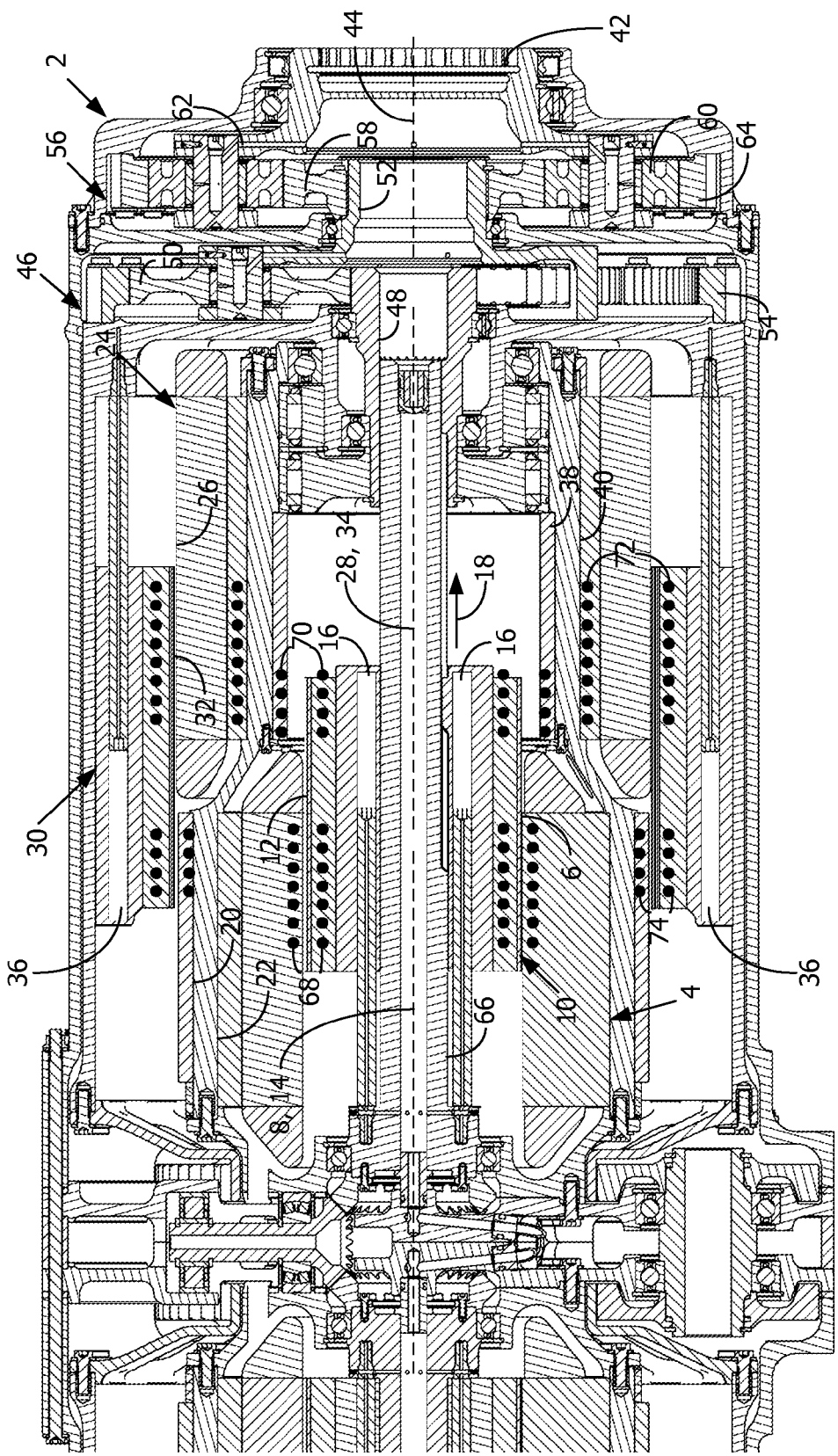
FIG. 1 is a cut-away side view of a first possible embodiment of the invention.

FIG. 1 is a cut-away side view of a coaxial twin variable field permanent magnetic dynamoelectric machine 2 according to a first possible embodiment of the invention. The machine 2 comprises a first stator 4 that has a first stator inner surface 6. The first stator inner surface 6 comprises a surface of revolution with a first stator axis 8. The first stator inner surface 6 may be generally cylindrical or it may be non-cylindrical, such as a conical or parabolic frustum.

A first permanent magnet rotor 10 comprises a first rotor outer surface 12 that is smaller than the first stator inner surface 6. The first rotor outer surface 12 comprises a surface of revolution with a first rotor axis 14 that is substantially coincident with the first stator axis 8 and with the first rotor outer surface 12 adjacent to the first stator inner surface 6. The first rotor outer surface 12 may be generally cylindrical or it may be non-cylindrical, such as a conical or parabolic frustum. At least one first axial hydraulic actuator 16 mounted within the first rotor 10 allows pressure of hydraulic fluid therein to displace the first rotor outer surface 12 along the first rotor axis 14 relative to the first stator inner surface 6 in a first axial direction indicated by arrow 18 to change magnetic flux interaction between the first stator 4 and the first rotor 10. A first magnetic flux containment shield 20 covers an outer surface 22 of the first stator 4 to keep the rotating magnetic field of the second rotor 30 from impinging and interfering with the first stator 4. The first magnetic shield 20 preferably comprises a stack of electrically insulated ferromagnetic laminations to reduce eddy current losses, as well known in the art.

The machine 2 also comprises a second stator 24 displaced from the first stator 4 in the first axial direction 18 that comprises a second stator outer surface 26. The second stator outer surface 26 comprises a surface of revolution with a second stator axis 28 that is substantially coincident with the first stator axis 8. The second stator outer surface 26 may be generally cylindrical or it may be non-cylindrical, such as a conical or parabolic frustum.

A second permanent magnet rotor 30 comprises a second rotor inner surface 32 that is larger than the second stator outer surface 26. The second rotor inner surface 32 comprises a surface of revolution with a second rotor axis 34 that is substantially coincident with the second stator axis 28 and with the second rotor inner surface 32 adjacent the second stator outer surface 26. The second rotor inner surface 32 may be generally cylindrical or it may be non-cylindrical, such as a conical or parabolic frustum. At least one second axial hydraulic actuator 36 mounted within the second rotor 30 allows pressure of hydraulic fluid therein to displace the second rotor inner surface 32 along the second rotor axis 34 relative to the second stator outer surface 26 in a second axial direction opposite the first axial direction indicated by arrow 18 to change magnetic flux interaction between the second stator 24 and the second rotor 30. A second magnetic flux containment shield 38 covers an inner surface 40 of the second stator 24 to keep the rotating magnetic field of the first rotor 10 from impinging and interfering with the second stator 24. The second magnetic shield 38 preferably comprises a stack of electrically insulated ferromagnetic laminations to reduce eddy current losses, as well known in the art.

A drive shaft 42 with an axis of rotation 44 that is substantially coincident with the first stator axis 8 and the second stator axis 28 couples to the first rotor 10 and second rotor 30. FIG. 1 shows such coupling by way of a first epicyclic gear train 46 that comprises a first sun gear 48, multiple first planet gears 50 attached to a first carrier 52 and a first ring gear 54, and an optional second epicyclic gear train 56 that comprises a second sun gear 58, multiple second planet gears 60 attached to a second carrier 62 and a stationary second ring gear 64. The first rotor 10 couples to the first sun gear 48 by way of a first rotor shaft 66. The second rotor 30 couples to the first ring gear 54. The first carrier 52 couples to the second sun gear 58 and the second carrier 62 couples to the drive shaft 42.

As well known in the art, the first epicyclic gear train 46 serves as a speed summing gear train. This may be useful in applications where the machine 2 serves as part of a power drive train for a tracked vehicle wherein each track may have the first stator 4 with the first rotor 10 serve as a steering motor and the second stator 24 with the second rotor 30 serve as a propulsion motor. The optional second gear train 56 may be useful to attain a desired level of torque at the drive shaft 42.

Figure 2:
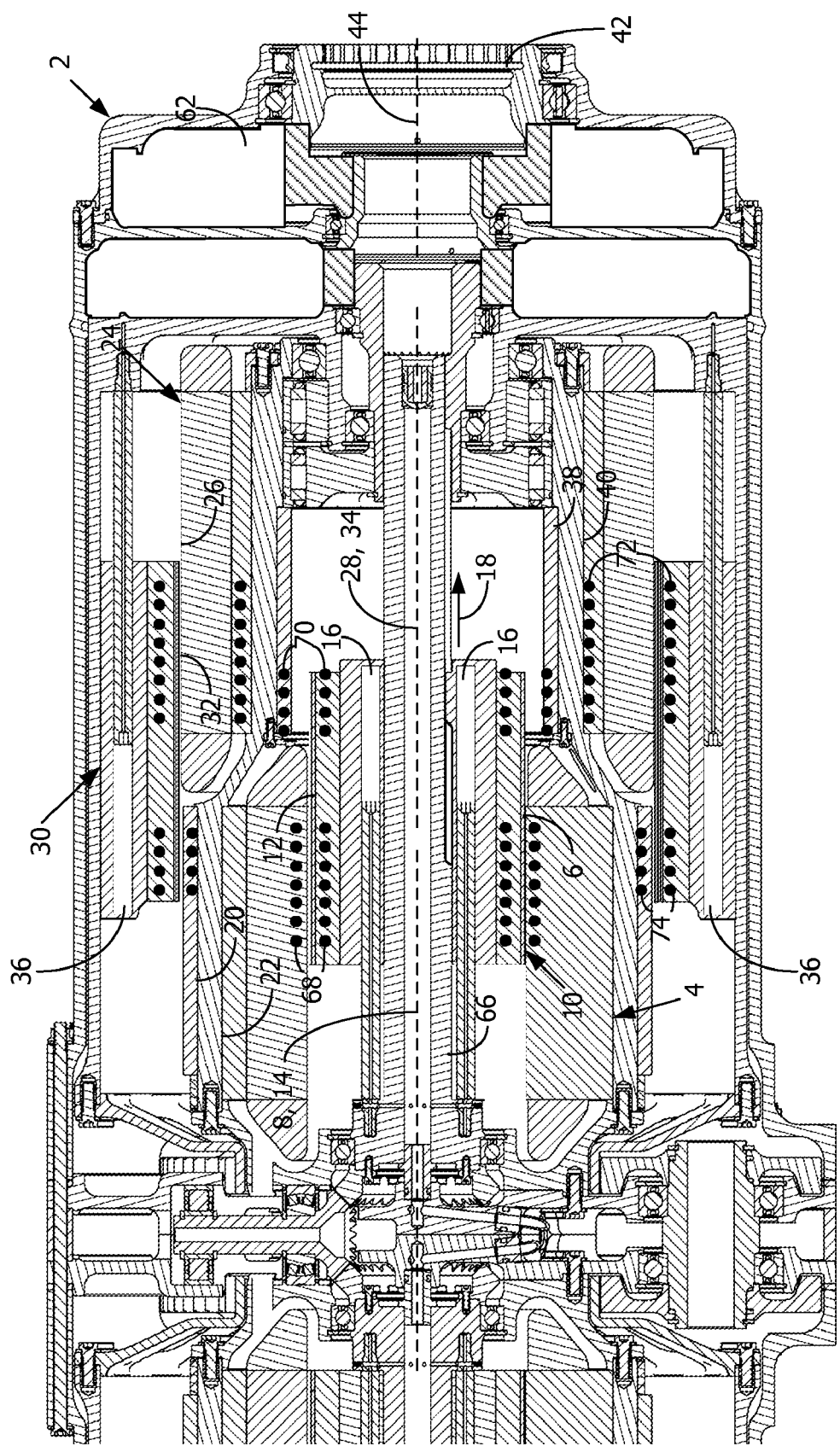
FIG. 2 is a cut-away side view of a second possible embodiment of the invention.

FIG. 2 is a cut-away side view of a coaxial twin variable field permanent magnetic dynamoelectric machine 68 according to a second possible embodiment of the invention. It is much the same as the machine 2 hereinbefore described in connection with FIG. 1, but in this case the first rotor 10 couples directly to the second rotor 30 and the drive shaft 42 by way of the first rotor shaft 66. As well known in the art, this direct-coupled arrangement results in a torque summing mode if the machine 68 serves as a motor, in which case the first stator 4 with the first rotor 10 serves as a first motor and the second stator 24 with the second rotor 30 serves as a second motor. Alternatively, the machine 68 could serve as a motor-generator or dynamotor, wherein the first stator 4 with the first rotor 10 serves as a generator and the second stator 24 with the second rotor 30 serves as a motor to power the generator.

In applications where it is impractical to stop the drive shaft 42 upon occurrence of a motor or generator fault condition, such as for aeronautical generators or fuel pump motors, it would be possible for the machine 68 to serve as a fault-tolerant twin motor or generator, it which case the first stator 4 with the first rotor 10 and the second stator 24 with the second rotor 30 both serve as a motor or generator with the ability to shut one of them down in a fault condition by fully displacing either the first rotor 10 or the second rotor 30, depending on whether the first stator 4 or second stator 24 has a fault.

Referring to FIGS. 1 and 2 together, first rotor-stator magnetic field lines 68 illustrate the general path of the magnetic field that the first rotor 10 generates proximate the first stator 4. As each first hydraulic actuator 16 displaces the first rotor 10 out of the first stator 4 to reduce the magnetic flux interaction between the first stator 4 and the first rotor 10, the first rotor-stator magnetic field lines 68 would tend to pass through the second stator 24 and interfere with its operation but for the second magnetic shield 38.

The second magnetic shield 38 shorts or diverts the magnetic field of the first rotor 4 through it as represented by first rotor-shield magnetic field lines 70 to bypass the second stator 24.

Likewise, second rotor-stator magnetic field lines 72 illustrate the general path of the magnetic field that the second rotor 30 generates proximate the first stator 4. As each second hydraulic actuator 36 displaces the second rotor 30 out of the second stator 24 to reduce the magnetic flux interaction between the second stator 24 and the second rotor 30, the second rotor-stator magnetic field lines 72 would tend to pass through the first stator 4 and interfere with its operation but for the first magnetic shield 20. The first magnetic shield 20 shorts or diverts the magnetic field of the second rotor 24 through it as represented by first rotor-shield magnetic field lines 74 to bypass the first rotor 4.

FIG. 3 is a detailed side view of the hereinbefore-described first and second magnetic flux containment shields 20 and 38. The shields 20 and 38 comprise multiple electrically insulated ferromagnetic laminations 76 that prevent the development of significant eddy currents along the surface of the shields 20 and 38 along an axial direction indicated by shield axis 78.

The described embodiments of the invention are only some illustrative implementations of the invention wherein changes and substitutions of the various parts and arrangement thereof are within the scope of the invention as set forth in the attached claims.

The claimed invention is:

1. A coaxial twin variable field permanent magnetic dynamoelectric machine that comprises: a first stator that comprises a first stator inner surface with a first stator axis;
   a first permanent magnet rotor that comprises a first rotor outer surface that is smaller than the first stator inner surface with a first rotor axis that is substantially coincident with the first stator axis and with the first rotor outer surface adjacent the first stator inner surface;
   at least one first axial hydraulic actuator mounted within the first rotor for axially displacing the first rotor outer surface along the first rotor axis relative to the first stator inner surface in a first axial direction to change magnetic flux interaction between the first stator the first rotor;
   a first magnetic shield that covers an outer surface of the first stator; a second stator displaced from the first stator in the first axial direction that comprises a second stator outer surface with a second stator axis that is substantially coincident with the first stator axis;
   a second permanent magnet rotor that comprises a second rotor inner surface that is larger than the second stator outer surface with a second rotor axis for the second rotor inner surface that is substantially coincident with the second stator axis and with the second rotor inner surface adjacent the second stator outer surface;
   at least one second axial hydraulic actuator mounted within the second rotor for axially displacing the second rotor inner surface along the second rotor axis relative to the second stator outer surface in a second axial direction opposite the first axial direction to change magnetic flux interaction between the second stator and the second rotor;
   a second magnetic shield that covers an inner surface of the second stator; and a drive shaft with a drive shaft axis of rotation that is substantially coincident with the first and second stator axes of rotation that couples to the first and second rotors;
   wherein the first axial hydraulic actuator may displace the first rotor outer surface within the second magnetic shield and the second axial hydraulic actuator may displace the second rotor inner surface over the first magnetic shield with reduced first rotor-second stator and second rotor-first stator magnetic flux interaction.

2. The machine of claim 1, wherein the drive shaft couples to the first and second rotors by means of at least one gear train.

3. The machine of claim 2, wherein an epicyclic gear train couples the first rotor to the second rotor to achieve a speed summing mode of operation.

4. The machine of claim 3, wherein the machine comprises a twin motor.

5. The machine of claim 1, wherein the drive shaft directly couples to the first and second rotors.

6. The machine of claim 5, wherein the machine comprises a twin motor.

7. The machine of claim 6, wherein the first rotor fully displaces if the first stator faults and the second rotor fully displaces if the second stator faults.

8. The machine of claim 5, wherein the machine comprises a twin generator.

9. The machine of claim 8, wherein the first rotor fully displaces if the first stator faults and the second rotor fully displaces if the second stator faults.

10. The machine of claim 5, wherein the first stator and the first rotor serve as a generator and the second stator and the second rotor serve as a motor.

11. The machine of claim 5, wherein the first stator and the first rotor serve as a motor and the second stator and the second rotor serve as a generator.

12. A coaxial twin variable field permanent magnetic dynamoelectric machine that comprises: a first stator that comprises a first stator inner surface with a first stator axis;
    a first permanent magnet rotor that comprises a first rotor outer surface that is smaller than the first stator inner surface with a first rotor axis that is substantially coincident with the first stator axis and with the first rotor outer surface adjacent the first stator inner surface;
    at least one first axial hydraulic actuator mounted within the first rotor for axially displacing the first rotor outer surface along the first rotor axis relative to the first stator inner surface in a first axial direction to change magnetic flux interaction between the first stator the first rotor;
    a first magnetic shield that covers an outer surface of the first stator; a second stator displaced from the first stator in the first axial direction that comprises a second stator outer surface with a second stator axis that is substantially coincident with the first stator axis;
    a second permanent magnet rotor that comprises a second rotor inner surface that is larger than the second stator outer surface with a second rotor axis for the second rotor inner surface that is substantially coincident with the second stator axis and with the second rotor inner surface adjacent the second stator outer surface;
    at least one second axial hydraulic actuator mounted within the second rotor for axially displacing the second rotor inner surface along the second rotor axis relative to the second stator outer surface in a second axial direction opposite the first axial direction to change magnetic flux interaction between the second stator and the second rotor;
    a second magnetic shield that covers an inner surface of the second stator; and a drive shaft with a drive shaft axis of rotation that is substantially coincident with the first and second stator axes of rotation that couples to the first and second rotors by means of at least an epicyclic gear train;
    wherein the first axial hydraulic actuator may displace the first rotor outer surface within the second magnetic shield and the second axial hydraulic actuator may displace the second rotor inner surface over the first magnetic shield with reduced first rotor-second stator and second rotor-first stator magnetic flux interaction.

13. The machine of claim 12, wherein the machine comprises a twin motor and the epicyclic gear train provides a speed-summing mode of operation.

14. A coaxial twin variable field permanent magnetic dynamoelectric machine that comprises: a first stator that comprises a first stator inner surface with a first stator axis;

a first permanent magnet rotor that comprises a first rotor outer surface that is smaller than the first stator inner surface with a first rotor axis that is substantially coincident with the first stator axis and with the first rotor outer surface adjacent the first stator inner surface;

at least one first axial hydraulic actuator mounted within the first rotor for axially displacing the first rotor outer surface along the first rotor axis relative to the first stator inner surface in a first axial direction to change magnetic flux interaction between the first stator the first rotor;

a first magnetic shield that covers an outer surface of the first stator; a second stator displaced from the first stator in the first axial direction that comprises a second stator outer surface with a second stator axis that is substantially coincident with the first stator axis;

a second permanent magnet rotor that comprises a second rotor inner surface that is larger than the second stator outer surface with a second rotor axis for the second rotor inner surface that is substantially coincident with the second stator axis and with the second rotor inner surface adjacent the second stator outer surface;

at least one second axial hydraulic actuator mounted within the second rotor for axially displacing the second rotor inner surface along the second rotor axis relative to the second stator outer surface in a second axial direction opposite the first axial direction to change magnetic flux interaction between the second stator and the second rotor;

a second magnetic shield that covers an inner surface of the second stator; and a drive shaft with a drive shaft axis of rotation that is substantially coincident with the first and second stator axes of rotation that directly couples to the first and second rotors;

wherein the first axial hydraulic actuator may displace the first rotor outer surface within the second magnetic shield and the second axial hydraulic actuator may displace the second rotor inner surface over the first magnetic shield with reduced first rotor-second stator and second rotor-first stator magnetic flux interaction.

15. The machine of claim 14, wherein the machine comprises a twin motor.

16. The machine of claim 15, wherein the first rotor fully displaces if the first stator faults and the second rotor fully displaces if the second stator faults.

17. The machine of claim 14, wherein the machine comprises a twin generator.

18. The machine of claim 17, wherein the first rotor fully displaces if the first stator faults and the second rotor fully displaces if the second stator faults.

19. The machine of claim 14, wherein the first stator and the first rotor serve as a generator and the second stator and the second rotor serve as a motor.

20. The machine of claim 14, wherein the first stator and the first rotor serve as a motor and the second stator and the second rotor serve as a generator.

* * * * *